United States Patent
Hiratsuka et al.

(10) Patent No.: US 8,802,294 B2
(45) Date of Patent: Aug. 12, 2014

(54) NICKEL HYDROXIDE, METHOD FOR PRODUCING POSITIVE ELECTRODE ACTIVE MATERIAL FOR NON-AQUEOUS ELECTROLYTE SECONDARY BATTERY, ELECTRODE FOR NON-AQUEOUS ELECTROLYTE SECONDARY BATTERY, AND NON-AQUEOUS ELECTROLYTE SECONDARY BATTERY

(75) Inventors: Hidekazu Hiratsuka, Osaka (JP); Shigeru Hanaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 851 days.

(21) Appl. No.: 12/513,641

(22) PCT Filed: Dec. 19, 2007

(86) PCT No.: PCT/JP2007/074445
§ 371 (c)(1),
(2), (4) Date: May 5, 2009

(87) PCT Pub. No.: WO2008/078628
PCT Pub. Date: Jul. 3, 2008

(65) Prior Publication Data
US 2010/0068624 A1    Mar. 18, 2010

(30) Foreign Application Priority Data
Dec. 22, 2006    (JP) ................................. 2006-345502

(51) Int. Cl.
*H01M 4/52*    (2010.01)
*C01G 53/00*    (2006.01)
*H01M 10/052*    (2010.01)
*H01M 4/48*    (2010.01)
*H01M 4/525*    (2010.01)
*H01M 10/0525*    (2010.01)

(52) U.S. Cl.
CPC .......... *H01M 4/525* (2013.01); *C01P 2002/52* (2013.01); *C01G 53/006* (2013.01); *C01P 2006/11* (2013.01); *H01M 4/52* (2013.01); *H01M 10/0525* (2013.01); *H01M 10/052* (2013.01); *C01G 53/50* (2013.01); *H01M 4/48* (2013.01); *C01P 2004/62* (2013.01); *C01P 2006/19* (2013.01); *Y02E 60/122* (2013.01); *C01P 2006/40* (2013.01); *C01G 53/42* (2013.01); *C01P 2004/61* (2013.01)
USPC ...................................... 429/223; 429/218.1

(58) Field of Classification Search
None
See application file for complete search history.

(56) References Cited

U.S. PATENT DOCUMENTS 5,278,001 A * 1/1994 Ono et al. ..................... 429/101
6,228,535 B1 * 5/2001 Fierro et al. .................. 429/223
(Continued)

FOREIGN PATENT DOCUMENTS

CN        1489230 A        4/2004
JP        07335220 A   *  12/1995
(Continued)

OTHER PUBLICATIONS

JP 07335220 A (English).*
(Continued)

*Primary Examiner* — Ula C Ruddock
*Assistant Examiner* — Scott J Chmielecki
(74) *Attorney, Agent, or Firm* — McDermott Will & Emery LLP

(57) ABSTRACT

A positive electrode active material for a non-aqueous electrolyte secondary battery, including a lithium nickel composite oxide, is produced by baking a nickel hydroxide having a mean primary particle size of 1 to 5 μm and a DBP absorption amount of 10 to 30 mL/100 g and a lithium compound in an oxidizing atmosphere. This lithium nickel composite oxide is excellent in packing characteristics and power characteristics (particularly high-rate characteristics), and useful as a positive electrode active material of a non-aqueous electrolyte secondary battery.

3 Claims, 1 Drawing Sheet

(56) References Cited

U.S. PATENT DOCUMENTS

| | | | |
|---|---|---|---|
| 6,335,119 B1 * | 1/2002 | Maruta | 429/223 |
| 6,752,918 B1 | 6/2004 | Olbrich et al. | |
| 2004/0091778 A1 | 5/2004 | Ozaki et al. | |
| 2005/0221182 A1 * | 10/2005 | Fujiwara et al. | 429/231.1 |

FOREIGN PATENT DOCUMENTS

| | | |
|---|---|---|
| JP | 11-001324 | 1/1999 |
| JP | 11-130440 | 5/1999 |
| JP | 11-135119 | 5/1999 |
| JP | 2002-208400 | 7/2002 |
| JP | 2005-285606 | 10/2005 |
| JP | 2006-265086 | 10/2006 |
| JP | 2007-095534 | 4/2007 |

OTHER PUBLICATIONS

Chinese Office Action issued in Chinese Patent Application No. 200780040414.5, dated Aug. 24, 2010.

Korean Office Action issued in Korean Patent Application No. 10-2009-7010022, mailed Feb. 18, 2011.

Japanese Office Action, issued in Japanese Patent Application No. 2007-326728, dated Dec. 15, 2011.

* cited by examiner

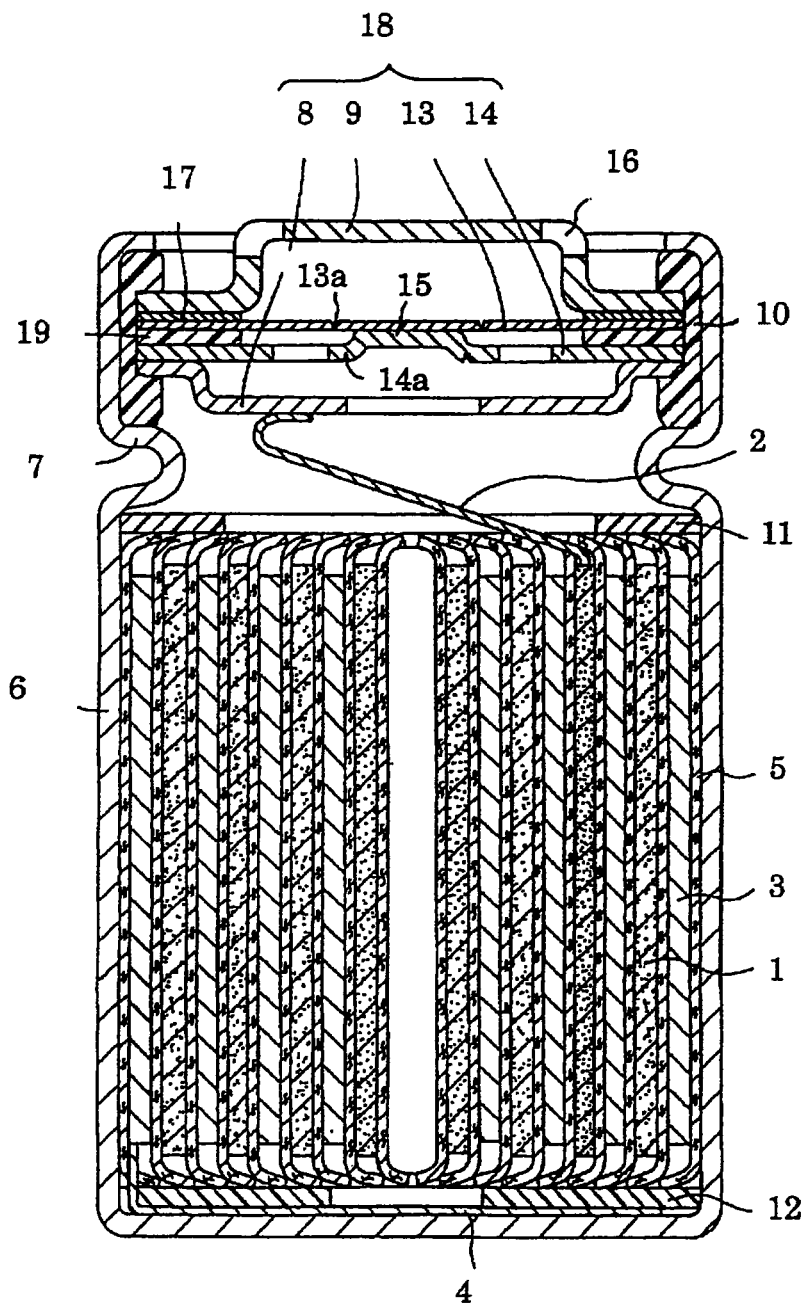

NICKEL HYDROXIDE, METHOD FOR PRODUCING POSITIVE ELECTRODE ACTIVE MATERIAL FOR NON-AQUEOUS ELECTROLYTE SECONDARY BATTERY, ELECTRODE FOR NON-AQUEOUS ELECTROLYTE SECONDARY BATTERY, AND NON-AQUEOUS ELECTROLYTE SECONDARY BATTERY

RELATED APPLICATIONS

This application is the U.S. National Phase under 35 U.S.C. §371 of International Application No. PCT/JP2007/074445, filed on Dec. 19, 2007, which in turn claims the benefit of Japanese Application No. 2006-345502, filed on Dec. 22, 2006, the disclosures of which Applications are incorporated by reference herein.

TECHNICAL FIELD

The invention relates to a nickel hydroxide, a method for producing a positive electrode active material for a non-aqueous electrolyte secondary battery, an electrode for a non-aqueous electrolyte secondary battery, and a non-aqueous electrolyte secondary battery. More particularly, the invention mainly relates to an improvement of positive electrode active materials used in non-aqueous electrolyte secondary batteries.

BACKGROUND ART

One example of positive electrode active materials for use in non-aqueous electrolyte secondary batteries is a lithium nickel composite oxide which includes nickel as the main component. A representative lithium nickel composite oxide is $LiNiO_2$. It is known that lithium nickel composite oxides are, for example, in the form of monodisperse primary particles which do not form secondary particles or in the form of secondary particles comprising agglomerated primary particles. In either form, the mean particle size is as small as 1 µm or less, so the specific surface area is large. When a lithium nickel composite oxide in the form of primary particles is used as a positive electrode active material of a non-aqueous electrolyte secondary battery, the insertion and extraction of lithium is easy since the area of the positive electrode active material in contact with electrolyte (or liquid electrolyte) is large.

A lithium nickel composite oxide is prepared, for example, by mixing lithium hydroxide and a nickel hydroxide, and baking the mixture at a temperature of approximately 600 to 800° C. in an oxidizing atmosphere. Since the lithium nickel composite oxide prepared by this method has many void spaces therein, it has a problem of pressing characteristics in electrode production, so that the packing density of the lithium nickel composite oxide in the active material layer becomes low. As a result, the battery capacity tends to become low. This possibility is remarkably high particularly when a spherical nickel hydroxide is used.

Also, a lithium nickel composite hydroxide in the form of monodisperse primary particles having a particle size of less than 1 µm does not have void spaces therein, but the total volume of void spaces between the primary particles per unit volume is large. Hence, in the same manner as described above, a problem of pressing characteristics in electrode production (hereinafter "electrode pressing characteristics") is likely to occur. Further, a lithium nickel composite hydroxide in the form of monodisperse primary particles adversely affects the stability of electrolyte or liquid electrolyte during storage, causing the electrolyte or liquid electrolyte to deteriorate. As a result, the power characteristics of the battery may lower.

Thus, one approach to reducing the void spaces between the particles can be to use particles larger than the conventionally used particles to form agglomerated particles. However, such an approach has not been specifically proposed.

Also, a method of producing a lithium nickel composite oxide has been proposed in which plate-shaped nickel hydroxide and a lithium compound are mixed, the mixture is dry ground, and the ground mixture is baked at 600 to 1000° C. in an oxidizing atmosphere (for example, see Patent Document 1). In the plate-shaped nickel hydroxide, the average major axis diameter of the primary particles is 1 to 50 µm, the average thickness is 0.1 to 10 µm, and the BET specific surface area as determined by $N_2$-BET method is 0.1 to 5 $m^2/g$. Patent Document 1 can produce a lithium nickel composite oxide that is in the form of plate-shaped particles having a relatively large particle size. Also, the technique of Patent Document 1 is characterized in that such a lithium nickel composite oxide can be obtained in a temperature range higher than 800° C., which is the upper limit of conventional baking temperature. It has been found that the use of such a lithium nickel composite oxide allows an improvement to some extent in electrode pressing characteristics.

However, according to the technique of Patent Document 1, if plate-shaped nickel hydroxide having a high nickel content is used in an attempt to obtain a high capacity lithium nickel composite oxide, the resultant lithium nickel composite oxide has a specific capacity (capacity per unit weight) that is low as an active material. It is well known from presentations at academic meetings etc. that if the baking is carried out in a temperature range of higher than 800° C. in particular, the resultant lithium nickel composite oxide has a significantly low specific capacity. The use of an active material having a low specific capacity in a battery inevitably results in the battery having low power characteristics.

As described above, according to conventional techniques, it is very difficult to improve the electrode pressing characteristics while maintaining the power characteristics of a battery.

Patent Document 1: Japanese Laid-Open Patent Publication No. Hei 11-1324

DISCLOSURE OF THE INVENTION

Problem to be Solved by the Invention

An object of the invention is to provide a positive electrode active material for a non-aqueous electrolyte secondary battery capable of improving the electrode pressing characteristics without lowering the power characteristics of a battery, a nickel hydroxide that can be used as a raw material for producing such a positive electrode active material, and an electrode for a non-aqueous electrolyte secondary battery and a non-aqueous electrolyte secondary battery which include such a positive electrode active material.

Means for Solving the Problem

In order to solve the problems discussed above, the present inventors have conducted diligent studies. As a result, they have found that in the preparation of a nickel hydroxide used as a raw material for producing a lithium nickel composite oxide, controlling the mean primary particle size and dibutyl phthalate absorption amount of the nickel hydroxide in a specific range permits the production of a desired positive electrode active material. Further, the present inventors have found that the use of such a positive electrode active material provides a non-aqueous electrolyte secondary battery having a high capacity and high power characteristics, since the positive electrode active material is packed at a high density. Based on these findings, they have completed the invention.

That is, the invention relates to a nickel hydroxide having a mean primary particle size of 1 to 5 μm and a dibutyl phthalate absorption amount (hereinafter "DBP absorption amount") of 10 to 30 mL/100 g.

The nickel hydroxide of the invention preferably has a tap density of 2.0 to 3.5 g/cc.

The nickel hydroxide of the invention preferably includes nickel and at least one metal element selected from the group consisting of cobalt, aluminum, manganese, magnesium, iron, copper, titanium, molybdenum, and zirconium.

The nickel hydroxide of the invention is preferably used to produce a lithium nickel composite oxide serving as a positive electrode active material of a non-aqueous electrolyte secondary battery.

The invention is also directed to a method for producing a positive electrode active material including a lithium nickel composite oxide for a non-aqueous electrolyte secondary battery, the method including baking the nickel hydroxide of the invention and a lithium compound in an oxidizing atmosphere.

The invention also pertains to an electrode for a non-aqueous electrolyte secondary battery, including a positive electrode active material for a non-aqueous electrolyte secondary battery obtained by the production method of a positive electrode active material for a non-aqueous electrolyte secondary battery of the invention.

The invention also relates to a non-aqueous electrolyte secondary battery including the electrode for a non-aqueous electrolyte secondary battery of the invention.

Effect of the Invention

The invention can provide a nickel hydroxide whose mean primary particle size and DBP absorption amount are in a specific range. By using this nickel hydroxide as one of the raw materials and, for example, baking it, it is possible to obtain a lithium nickel composite oxide without lowering the specific capacity as an active material. Since this lithium nickel composite oxide has a high specific capacity and excellent electrode pressing characteristics, it can be packed at a high density. Thus, when the lithium nickel composite oxide of the invention is contained in a positive electrode active material layer of a positive electrode included in a non-aqueous electrolyte secondary battery, it is possible to provide a significantly high capacity and high power.

BRIEF DESCRIPTION OF THE DRAWING

FIG. 1 is a longitudinal sectional view schematically showing the structure of a cylindrical non-aqueous electrolyte secondary battery in one embodiment of the invention.

BEST MODE FOR CARRYING OUT THE INVENTION

[Nickel Hydroxide]

The nickel hydroxide of the invention is characterized by having a mean primary particle size of 1 to 5 μm and a DBP absorption amount of 10 to 30 mL/100 g. It can be preferably used as a raw material for producing a lithium nickel composite oxide that is used as a positive electrode active material in a non-aqueous electrolyte secondary battery or the like.

If the mean primary particle size is less than 1 μm, the particles of the lithium nickel composite oxide obtained by baking such a nickel hydroxide undesirably have many void spaces therein, which may result in degradation of electrode pressing characteristics and packing characteristics. On the other hand, if the mean primary particle size exceeds 5 μm, the lithium nickel composite oxide obtained by baking such a nickel hydroxide has a low reactivity with electrolyte (or liquid electrolyte), which may result in degradation of battery performance such as rate characteristics.

In this specification, in the case of spherical primary particles, the mean primary particle size was determined by observing the surfaces of secondary particles with a scanning electron microscope, measuring the diameters of 100 primary particles, and averaging the measured values. Also, in the case of scaly primary particles, the mean primary particle size was determined by observing the surfaces of secondary particles with a scanning electron microscope, measuring the major axis diameters of 100 primary particles, and averaging the measured values. In the case of scaly particles, the length in the thickness direction is the minor axis diameter, and the largest length in the direction perpendicular to the thickness direction is the major axis diameter. The mean primary particle size can be controlled, for example, by adjusting the pH of the reaction system used in a method for producing a nickel hydroxide which will be described below.

Also, the DBP absorption amount is a numerical value that indicates the size of the agglomeration structure of the nickel hydroxide. When the DBP absorption amount is in the aforementioned range, the particle structure of the lithium nickel composite oxide obtained by baking such a nickel hydroxide can be controlled. As a result, high packing becomes possible, and a lithium nickel composite oxide allowing a battery to have a high power can be obtained. If the DBP absorption amount is less than 10 mL/100 g, the particles of the lithium nickel composite oxide obtained by baking such a nickel hydroxide have fewer void spaces therein, and the effective reaction area with electrolyte (or liquid electrolyte) decreases. Hence, good high-rate charge/discharge characteristics may not be obtained. On the other hand, if the DBP absorption amount exceeds 30 ml/100 g, the particles of the lithium nickel composite oxide obtained by baking such a nickel hydroxide undesirably have many void spaces therein, which may result in degradation of electrode pressing characteristics and packing characteristics. The DBP absorption amount can be controlled, for example, by adjusting the stirring speed in a method for producing a nickel hydroxide that will be described below.

In this specification, the DBP absorption amount was measured according to DBP (dibutyl phthalate) absorption amount determination method A (mechanical method) defined in JIS K-6217-4 "Carbon black for rubber industry—Fundamental characteristics—Part 4: Determination of DBP absorption amount".

Generally, when the primary particle size of a positive electrode active material is minimized to heighten the power of a battery, the secondary particles composed of agglomerated primary particles have many void spaces therein, so the packing characteristics of the positive electrode active material lower. Also, in order to maintain the electronic conductivity and the binding characteristics, it is necessary to increase the content of a conductive agent and a binder in the positive electrode active material layer. As a result, the battery capacity may significantly decrease. On the other hand, when the primary particle size of a positive electrode active material is enlarged, the void spaces in the secondary particles decrease, but the ionic conductivity of the positive electrode active material lowers. Further, the specific surface area of the positive electrode active material significantly decreases. As a result, the effective reaction area of the positive electrode active material with electrolyte (or liquid electrolyte) decreases, and good high-rate charge/discharge characteristics cannot be obtained.

From the above viewpoints, in order to improve battery performance, it is important to control both the powder physical properties and the agglomeration structure of the positive electrode active material. In lithium nickel composite oxides, in particular, depending on the baking temperature, the specific capacity of the resultant lithium nickel composite oxide often varies. However, it is difficult to control the particle size and the agglomeration state by merely changing the baking temperature. The particle size and the agglomeration state of a nickel hydroxide used as a raw material affect the particle size and the agglomeration state of the resultant positive electrode active material. It is thus necessary to control the particle surface state, particle size, agglomeration structure, etc. of the nickel hydroxide used as a raw material.

Based on these findings, the present inventors have conducted diligent studies and found a nickel hydroxide in which the mean primary particle size is adjusted in the range of 1 to 5 μm and the DBP absorption amount is adjusted in the range of 10 to 30 mL/100 g.

This nickel hydroxide is substantially spherical agglomerated particles (secondary particles) composed of spherical or scaly fundamental particles (primary particles) that are closely jointed together. The nickel hydroxide of the invention is capable of contributing to heightening the power of a battery. In this specification, "substantially spherical" refers to a completely spherical shape and a shape similar to a completely spherical shape.

By mixing a nickel hydroxide having such a structure with a lithium compound and then baking it at a predetermined temperature, a lithium nickel composite oxide used as a positive electrode active material can be obtained. This lithium nickel composite oxide has a high specific capacity as a positive electrode active material and excellent electrode pressing characteristics, and can be packed into the positive electrode active material layer at a high density. Thus, it can significantly contribute to heightening the capacity and power of a battery.

The nickel hydroxide of the invention preferably has a tap density of 2.0 to 3.5 g/cc. When the tap density is in this range, the lithium nickel composite oxide obtained by baking such a nickel hydroxide can be adjusted to a suitable density. If the tap density is less than 2.0 g/cc, the lithium nickel composite oxide obtained by baking such a nickel hydroxide has a low density and the ratio of the amount of the positive electrode active material to the volume of a lithium ion secondary battery decreases, which may result in a low charge/discharge capacity per volume. On the other hand, if the tap density exceeds 3.5 g/cc, the lithium nickel composite oxide obtained by baking such a nickel hydroxide has a large particle size and the electrode surface has large depressions and protrusions, which may penetrate through the polymer film separator made of polypropylene or the like disposed between the positive and negative electrodes of the lithium ion secondary battery, thereby causing a short-circuit. The tap density can be adjusted by controlling, for example, the stirring speed in the synthesis of the nickel hydroxide of the invention.

In this specification, the tap density was calculated according to JIS K5101, using a powder tester (product name: PT-S, available from Hosokawa Micron Corporation). That is, a powder was dropped into a tapping cell of 100 ml until the cell was filled therewith, and then a tapping of a stroke length of 10 mm was made 300 times. The tap density of a nickel hydroxide was calculated from the weight and volume of the powder.

The nickel hydroxide of the invention may include nickel and at least one metal element selected from the group consisting of cobalt, manganese, aluminum, magnesium, iron, copper, titanium, molybdenum, and zirconium. Among these metal elements, cobalt is particularly preferable. While the mixing ratio of nickel to other metal element(s) is not particularly limited, it is preferably from 1:2 to 8:1 (molar ratio). In order for such metal element(s) to be included in the nickel hydroxide of the invention, for example, a nickel salt (preferably nickel sulfate) and a salt containing at least one of these metal elements (preferably sulfate) can be used in combination to synthesize the nickel hydroxide.

The nickel hydroxide of the invention can be prepared, for example, by bringing an alkaline agent into contact with a nickel salt in water while stirring. At this time, it is also possible to use the nickel salt and at least one salt containing other metal element(s) than nickel.

Examples of nickel salts include nickel sulfate, nickel nitrate, nickel chloride, nickel acetate, and nickel oxalate. Among them, nickel sulfate is preferable. These nickel salts can be used singly or in combination of two or more of them. Preferable examples of salts containing other metal element(s) than nickel include water-soluble cobalt salts, water-soluble manganese salts, and water-soluble aluminum salts. Examples of water-soluble cobalt salts include cobalt sulfate, cobalt hydroxide, cobalt nitrate, and cobalt chloride; preferred are cobalt sulfate and cobalt nitrate. Examples of water-soluble manganese salts include manganese nitrate, manganese chloride, and manganese sulfate; for example, manganese sulfate and manganese nitrate are preferred. Examples of water-soluble aluminum salts include aluminum nitrate, aluminum sulfate, aluminum chloride, aluminum phosphate, and aluminum acetate; preferred are aluminum nitrate and aluminum sulfate. When one of these salts is used in combination with a nickel salt, for example, a cobalt-nickel complex, an aluminum-nickel complex, or a manganese-nickel complex is formed. Also, when two of these salts, for example, a cobalt salt and an aluminum salt are used in combination with a nickel salt, a cobalt-aluminum-nickel complex is formed.

The nickel salt is preferably used in the form of an aqueous solution. The salt concentration or ion concentration of an aqueous solution of the nickel salt is preferably adjusted so that the electrical conductivity is 80 mS/cm to 150 mS/cm. The salt concentration is adjusted, for example, by adding a salt concentration regulator to the aqueous solution of the nickel salt. Examples of salt concentration regulators include ammonium salts such as ammonium sulfate, and alkali metal salts such as sodium sulfate and sodium chloride.

If the electrical conductivity is less than 80 mS/cm, the ion concentration is low. Thus, in the process of growth of nickel hydroxide particles, the particles may not agglomerate densely due to weak cohesive power of the particles, and the tapping density of the nickel hydroxide may not become high. On the other hand, if the electrical conductivity exceeds 150 mS/cm, the growing speed of the nickel hydroxide particles becomes too high, and it is difficult to supply the nickel salt so as to keep up with the speed.

The nickel hydroxide is synthesized with stirring, as described above. The shearing force created by the stirring affects the growth of the nickel hydroxide particles. As the shearing force is stronger, the mean particle size of the nickel hydroxide becomes smaller. Hence, the synthesis reaction of the nickel hydroxide is preferably performed in a reaction vessel equipped with: a stirring blade having a low ability to exert a shearing force to a reaction system and being capable of circulating the whole reaction system homogeneously without allowing at least a part of the reaction system to remain stationary; and a stirrer which rotates the stirring blade. An example of such stirring blades is an axial-flow-type pitched paddle double-stage impeller.

With respect to the stirring speed, the following points need to be considered. That is, lowering the stirring speed can increase the growing speed of the reaction product nickel hydroxide. However, if the stirring speed is lowered so that the flowability of the reaction system becomes too low, the dispersibility of the nickel hydroxide produced in the reaction system decreases. As a result, the particle size of the finally obtained nickel hydroxide becomes uneven, and the tap density also becomes low. Therefore, when a stirring blade is used for stirring in the invention, it is preferable to adjust the number of revolutions of the stirring blade in the range of 100 rpm to 150 rpm. If the number of revolutions of the stirring blade is less than 100 rpm, the flowability of the reaction system becomes low, which may result in the aforementioned problem. If the number of revolutions of the stirring blade exceeds 150 rpm, a large shearing force is exerted to the reaction system, thereby increasing the collision frequency of the nickel hydroxide particles and suppressing the crystal growth.

The alkaline agent can be a common alkaline agent, and examples include alkali metal hydroxides such as sodium hydroxide and potassium hydroxide. The alkaline agent is preferably used in the form of an aqueous solution. The alkaline agent is preferably used so as to make the pH of the reaction system 11.1 to 11.5. If the pH is less than 11.1, the crystallinity of crystal grains of the nickel hydroxide may become too good, thereby resulting in excessively large crystals. On the other hand, if the pH exceeds 11.5, a large amount of minute particles may be produced, thereby leading to decreased mean particle size, broad particle size distribution, and low reaction system flowability.

This reaction is preferably carried out at a temperature of approximately 30 to 50° C. Upon completion of the reaction, the reaction mixture contains deposited nickel hydroxide particles. The nickel hydroxide particles are washed with water, filtered, and dried to obtain a nickel hydroxide of the invention.

The production method of a nickel hydroxide is preferably carried out by using a production apparatus including: a reaction vessel equipped with a stirrer, an axial-flow-type pitched paddle double-stage impeller, and a pH meter; an alkaline agent supply pump; a tank equipped with a filtering device; a washing machine; and a drying machine. In the reaction vessel, a nickel hydroxide is synthesized under the above conditions. An aqueous solution of a nickel salt serving as a raw material and an aqueous solution of a salt containing other metal element(s) than nickel are supplied into the reaction vessel, for example, continuously. The nickel hydroxide produced in the reaction vessel overflows, together with water, into the tank equipped with the filtering device. The alkaline agent supply pump supplies an alkaline agent to the reaction vessel depending on the measurement result by the pH meter. In the tank equipped with the filtering device, the water containing the nickel hydroxide is filtered to separate the solid content from the liquid content. The washing machine washes with water the nickel hydroxide separated in the tank equipped with the filtering device. The drying machine dries the nickel hydroxide.

[Positive Electrode Active Material and Electrode for Non-Aqueous Electrolyte Secondary Battery]

The positive electrode active material for a non-aqueous electrolyte secondary battery according to the invention (hereinafter referred to as simply "the positive electrode active material of the invention") includes a lithium nickel composite oxide. The lithium nickel composite oxide can be produced in the same manner as conventional lithium nickel composite oxides except for the use of the nickel hydroxide of the invention. For example, the lithium nickel composite oxide of the invention can be produced by mixing the nickel hydroxide of the invention and a lithium compound, baking the resultant mixture at 600 to 800° C. in an oxidizing atmosphere, and if necessary, crushing it. The oxidizing atmosphere can be oxygen, air or the like.

The lithium compound can be any known one, and lithium hydroxide is particularly preferable. The ratio of the nickel hydroxide to the lithium compound is not particularly limited, and can be suitably selected depending on the other components of the non-aqueous electrolyte secondary battery than the positive electrode active material that is intended to be produced, the application of the non-aqueous electrolyte secondary battery, etc.

The lithium nickel composite oxide of the invention has substantially the same mean primary particle size and DBP absorption amount as the raw material nickel hydroxide, and has a high specific capacity as a positive electrode active material. Thus, when the lithium nickel composite oxide of the invention, which has good electrode pressing characteristics, is used to produce a positive electrode, the lithium nickel composite oxide can be packed into the positive electrode active material layer at a high density. The resultant positive electrode has a high capacity. It is thus possible to heighten the capacity and power of the battery.

To produce a positive electrode by using the lithium nickel composite oxide of the invention, the same method as the conventional one can be employed. For example, a positive electrode can be obtained by applying a positive electrode mixture paste containing the lithium nickel composite oxide of the invention onto a positive electrode current collector, drying it to form a positive electrode active material layer, and if necessary, rolling it. The positive electrode active material layer can be formed on each side of the positive electrode current collector in the thickness direction. When the positive electrode active material layer is formed on one side of the positive electrode current collector, the thickness of the positive electrode active material layer is preferably 20 to 150 μm. When it is formed on each side of the positive electrode current collector, the total thickness is preferably 50 to 250 μm.

The positive electrode current collector can be one commonly used in the field of non-aqueous electrolyte secondary batteries, and examples include sheets and foil comprising stainless steel, aluminum, an aluminum alloy, titanium, etc. The sheet may be made of a porous material. Examples of porous materials include foamed materials, woven fabric, and non-woven fabric. While the thickness of the sheet and foil is not particularly limited, it is commonly 1 to 500 μm, and preferably 10 to 60 μm. Among these, for example, aluminum and an aluminum alloy are preferable. The surface of the positive electrode current collector may be subjected to a lath process or etching process.

In addition to the lithium nickel composite oxide of the invention, the positive electrode mixture paste can contain a conventionally known positive electrode active material, a conductive agent, a binder, a thickener, a dispersion medium, etc.

Examples of conventionally known positive electrode active materials include olivine-type lithium salts, chalcogenides, manganese dioxide, and conventional lithium-containing composite metal oxides. A conventional lithium-containing composite metal oxide is a metal oxide containing lithium and transition metal, or such a metal oxide in which part of the transition metal is replaced with one or more other elements. Examples of other elements include Na, Mg, Sc, Y, Mn, Fe, Co, Ni, Cu, Zn, Al, Cr, Pb, Sb, and B, and for example, Mn, Al, Co, Ni, and Mg are preferable. Other elements can be used singly or in combination of two or more of them.

Among them, conventional lithium-containing composite metal oxides can be preferably used. Examples of lithium-containing composite metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ wherein M is at least one element selected from the group consisting of Na, Mg, Sc, Y, Mn, Fe, Co, Ni, Cu, Zn, Al, Cr, Pb, Sb, V, and B, x=0 to 1.2, y=0 to 0.9, and z=2.0 to 2.3. The value x representing the molar ratio of lithium decreases/increases due to charge/discharge. Also, an example of an olivine-type lithium salt is $LiFePO_4$. Examples of chalcogenides include titanium disulfide and molybdenum disulfide. These conventional positive electrode active materials can be used singly or in combination of two or more of them. Conventional positive electrode active materials are used so as not to impair the effects of the lithium nickel composite oxide of the invention.

The conductive agent can be, for example, carbon black, graphite, carbon fibers, metal fibers, etc. Examples of carbon black include acetylene black, ketjen black, channel black, furnace black, lamp black, and thermal black. These conductive agents can be used singly or in combination of two or more of them.

The binder can be any material capable of being dissolved or dispersed in a dispersion medium, without any particular limitation. Examples include polyethylene, polypropylene, fluorocarbon binders, rubber particles, acrylic polymers, and vinyl polymers. Examples of fluorocarbon binders include polytetrafluoroethylene (PTFE), polyvinylidene fluoride (PVDF), a tetrafluoroethylene-hexafluoropropylene copolymer (FEP), and a vinylidene fluoride-hexafluoropropylene copolymer. They are preferably used in the form of a dispersion. Examples of rubber particles include acrylic rubber particles, styrene-butadiene rubber (SBR) particles, and acrylonitrile rubber particles. Among them, binders containing fluorine are preferable in consideration of, for example, improving the oxidation resistance of the positive electrode active material layer. These binders can be used singly or in combination of two or more of them.

The thickener can be one commonly used in this field, and examples include an ethylene-vinyl alcohol copolymer, carboxymethyl cellulose, and methyl cellulose.

The dispersion medium is desirably one into which the binder is capable of being dispersed or dissolved. In the case of using an organic binder, preferable examples of the dispersion medium include amides such as N,N-dimethylformamide, dimethyl acetamide, methyl formamide, hexamethylsulforamide, and tetramethyl urea, amines such as N-methyl-2-pyrrolidone (NMP) and dimethyl amine, ketones such as methyl ethyl ketone, acetone, and cyclohexanone, ethers such as tetrahydrofuran, and sulfoxides such as dimethyl sulfoxide. Among them, for example, NMP and methyl ethyl ketone are preferable. Also, in the case of using an aqueous binder such as SBR, the dispersion medium is preferably water or warm water. These dispersion media can be used singly or in combination of two or more of them.

To prepare the positive electrode mixture paste, a method commonly used in this field can be employed. An exemplary method is to mix the above-described components using a mixing device such as a planetary mixer, homomixer, pin mixer, kneader, or homogenizer. These mixing devices are used singly or in combination of two or more of them. Further, in the step of kneading the positive electrode mixture paste, various additives such as a dispersing agent, surfactant, or stabilizer may be used, if necessary.

The positive electrode mixture paste can be applied onto the surface of a positive electrode current collector by using, for example, a slit die coater, reverse roll coater, lip coater, blade coater, knife coater, gravure coater, or dip coater. The positive electrode mixture paste applied onto the positive electrode current collector is preferably dried in a manner close to air drying; however, in consideration of productivity, it is preferable to dry at a temperature of 70° C. to 200° C. for 10 minutes to 5 hours.

With respect to the rolling, the positive electrode plate is rolled at a linear pressure of 1000 to 2000 kg/cm several times until it has a predetermined thickness of 130 μm to 200 μm. Alternatively, the linear pressure may be changed.

[Non-Aqueous Electrolyte Secondary Battery]

The non-aqueous electrolyte secondary battery of the invention can have the same structure as the conventional non-aqueous electrolyte secondary battery except for the use of the electrode of the invention as the positive electrode.

FIG. 1 is a longitudinal sectional view schematically showing the structure of a non-aqueous electrolyte secondary battery in one embodiment of the invention. The non-aqueous electrolyte secondary battery illustrated in FIG. 1 is a cylindrical lithium ion secondary battery. It includes a power generating element composed of an electrolyte (or liquid electrolyte) (not shown) and an electrode plate assembly comprising a positive electrode plate 1, a negative electrode plate 3, and a separator 5 interposed between the positive electrode plate 1 and the negative electrode plate 3. It also includes a cylindrical battery case 6 having a bottom and containing the power generating element, a seal member 18 for sealing the opening of the battery case 6, and an insulating gasket 10 disposed between the open edge of the battery case 6 and the seal member.

Also, disposed on and under the electrode plate assembly are an upper insulator plate 11 and a lower insulator plate 12, respectively.

A little below the upper end of the opening of the battery case 6, an inward recess is provided, and an annular support part 7 protrudes toward the inner side of the battery case 6. To the annular support part 7 is fitted the seal member 18. The circumference of the seal member 18 is fitted with the insulating gasket 10, which insulates the battery case 6 from the seal member 18. Further, the open edge of the battery case 6 is crimped onto the insulating gasket 10 to seal the battery case 6.

The seal member 18 is composed of a plate 8, a cap 9 serving as a terminal for external connection, and an upper valve 13 and a lower valve 14 disposed between the plate 8 and the cap 9. An insulating filter 19 is sandwiched between the upper valve 13 and the lower valve 14. The upper valve 13 and the lower valve 14 are connected at a welding point 15 for conduction. Also, the upper valve 13 has an annular part 13a that breaks easily, while the lower valve 14 has an annular part 14a that breaks easily. When the battery internal pressure rises, the part 14a of the lower valve 14 breaks, and when the battery internal pressure further rises, the part 13a of the upper valve 13 breaks, thereby allowing the gas to be released from a vent hole 16 of the cap 9. This prevents the battery internal pressure from rising abnormally.

A positive electrode lead 2 attached to the positive electrode plate 1 is connected to the plate 8, while a negative electrode lead 4 attached to the negative electrode plate 3 is connected to the inner bottom of the battery case 6.

In the cylindrical lithium ion secondary battery illustrated in FIG. 1, a PTC device 17 is disposed between the cap 9 and the upper valve 13 to enhance safety.

The positive electrode plate 1 has the same structure as the above-described positive electrode of the invention. That is, the positive electrode plate 1 includes a positive electrode current collector and a positive electrode active material layer. The positive electrode active material layer is carried on the surface of the positive electrode current collector and contains the positive electrode active material produced by using the nickel hydroxide of the invention. The positive electrode plate 1 can be prepared, for example, by applying a positive electrode mixture paste onto both sides of the positive electrode current collector, drying it, and rolling it to form the positive electrode active material layers. Also, the positive electrode plate 1 is provided with a blank area where no active material layer is formed, to which the positive electrode lead 2 is welded.

The negative electrode plate 3 can be prepared, for example, by applying a negative electrode paste onto one or both sides of a negative electrode current collector, drying it, and rolling it to form a negative electrode active material layer. The negative electrode plate 3 is provided with a blank area where no active material layer is formed, to which the negative electrode lead 4 is welded.

The negative electrode current collector is preferably made of a copper foil having a thickness of 10 μm to 50 μm. Also, the surface of the negative electrode current collector may be subjected to a lath process or etching process.

The negative electrode paste is prepared by mixing a negative electrode active material, a binder, and a dispersion medium. Also, the negative electrode paste may contain a conductive agent, thickener, etc., if necessary.

While the negative electrode active material is not particularly limited, it is preferable to use a carbon material capable of absorbing and desorbing lithium ions due to charge and discharge. Preferable examples include carbon materials obtained by baking an organic polymer compound (phenolic resin, polyacrylonitrile, cellulose, etc.), carbon materials obtained by baking coke or pitch, artificial graphite, natural graphite, pitch-type carbon fibers, and PAN-type carbon fibers. With respect to the shape of the negative electrode active material it is, for example, in the form of fibers, spheres, scales, and lumps.

The binder, conductive agent, and thickener can be those commonly used in this field. For example, the same materials as conventional ones can be used. For example, the same binder, conductive agent, and thickener as those used in the positive electrode plate 1 can be used.

The separator 5 is preferably a microporous film made of a polymeric material. Examples of the polymeric material include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyether (polyethylene oxide or polypropylene oxide), cellulose (carboxymethyl cellulose or hydroxypropyl cellulose), poly (meth)acrylic acid, and a poly(meth)acrylic acid ester. These polymeric materials can be used singly or in combination of two or more of them. It is also possible to use a multi-layer film composed of such microporous films that are laminated. Among them, a microporous film made of polyethylene, polypropylene, polyvinylidene fluoride or the like is preferable. The thickness of the microporous film is preferably 15 μm to 30 μm.

The battery case 6 can be formed of copper, nickel, stainless steel, nickel plated steel or the like. By subjecting a metal plate made of such a material to a process such as drawing, it can be shaped into a battery case. In order to enhance the corrosion resistance of the battery case, the battery case after the process may be subjected to a plating process.

Also, the use of a battery case made of aluminum or an aluminum alloy permits the production of a prismatic secondary battery that is lightweight and high in energy density.

The non-aqueous solvent preferably includes a cyclic carbonate and a chain carbonate as the main component. For example, as the cyclic carbonate, it is preferable to use at least one selected from ethylene carbonate, propylene carbonate, and butylene carbonate. Also, as the chain carbonate, it is preferable to use at least one selected from the group consisting of, for example, dimethyl carbonate, diethyl carbonate, and ethyl methyl carbonate.

The solute can be, for example, a lithium salt whose anion has a functional group with a strong electron withdrawing property. Such examples include $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These solutes can be used singly or in combination of two or more of them. Also, it is preferable to dissolve these solutes in the non-aqueous solvent at a concentration of 0.5 to 1.5 M.

The plate 8 can be formed of a material that is resistant to electrolyte (or liquid electrolyte) and heat, without being particularly limited. Among them, aluminum or an aluminum alloy, which is lightweight and resistant to electrolyte (or liquid electrolyte) and heat, is preferable.

The upper valve 13 and the lower valve 14 are preferably made of a flexible thin metal foil made of aluminum.

The positive electrode lead 2 and the negative electrode lead 4 can be those known in the art. For example, the positive electrode lead can be made of aluminum or the like. The negative electrode lead can be made of nickel or the like.

EXAMPLES

The invention is hereinafter described specifically by way of Examples and Comparative Examples, but the invention is not to be construed as being limited to these Examples.

Example 1

While an aqueous solution of 2 mol/L nickel sulfate, an aqueous solution of 0.353 mol/L cobalt sulfate, and an aqueous solution of 5 mol/L ammonium nitrate were continuously injected into a reaction vessel equipped with a stirrer, an aqueous solution of 10 mol/L sodium hydroxide was injected therein in such a manner that the pH inside the reaction vessel was automatically maintained at 11.1 to 11.5. Also, sodium sulfate was added to adjust the salt concentration so that the electrical conductivity was 80 mS/cm to 150 mS/cm. The temperature inside the reaction vessel was maintained at 40° C., and stirring was continuously made by the stirrer. The hydroxide produced was taken out by causing it to overflow through an overflow pipe, washed with water, dehydrated, and dried. In this way, nickel hydroxides 1 to 13 of composition formula $Ni_{0.85}Co_{0.15}(OH)_2$ were prepared.

Also, by using the same synthesis procedure as that described above, but changing the aqueous solution of the salt containing metal element(s) other than nickel, the mixing ratio thereof, and the reaction conditions, the following hydroxides were prepared: nickel hydroxides 14 to 16 of composition formula $Ni_{0.80}Co_{0.15}Al_{0.15}(OH)_2$; nickel hydroxides 17 to 19 of composition formula $Ni_{0.70}Co_{0.15}Al_{0.15}(OH)_2$; nickel hydroxides 20 to 22 of composition formula $Ni_{0.70}Co_{0.15}Mn_{0.15}(OH)_2$; nickel hydroxides 23 to 25 of composition formula $Ni_{0.60}Co_{0.20}Mn_{0.20}(OH)_2$; nickel hydroxides 26 to 28 of composition formula $Ni_{0.55}Co_{0.225}Mn_{0.225}(OH)_2$; and nickel hydroxides 29 to 31 of composition formula $Ni_{0.50}Co_{0.25}Mn_{0.25}(OH)_2$.

Table 1 shows the mean particle sizes, DBP absorption amounts, and tap densities of the nickel hydroxides 1 to 31.

TABLE 1

| Nickel hydroxide No. | Salt concentration (mS/cm) | Rotation speed of stirring blade (rpm) | pH | Mean particle size of primary particles (μm) | DBP absorption amount (ml/100 g) | Tap density (g/cc) |
|---|---|---|---|---|---|---|
| 1 | 80 | 150 | 11.5 | 0.5 | 32.0 | 1.50 |
| 2 | 100 | 150 | 11.5 | 1.0 | 31.0 | 1.70 |
| 3 | 100 | 150 | 11.3 | 1.1 | 29.9 | 2.01 |
| 4 | 100 | 150 | 11.1 | 1.2 | 24.5 | 2.20 |
| 5 | 100 | 100 | 11.1 | 1.7 | 20.5 | 2.30 |
| 6 | 120 | 150 | 11.5 | 2.1 | 25.0 | 2.33 |
| 7 | 120 | 100 | 11.5 | 2.4 | 19.8 | 2.66 |
| 8 | 120 | 100 | 11.3 | 2.9 | 15.7 | 3.05 |
| 9 | 120 | 100 | 11.1 | 3.0 | 13.0 | 3.21 |
| 10 | 150 | 150 | 11.5 | 4.5 | 12.1 | 3.34 |
| 11 | 150 | 100 | 11.5 | 4.9 | 11.0 | 3.49 |
| 12 | 150 | 100 | 11.3 | 5.0 | 9.9 | 3.60 |
| 13 | 150 | 100 | 11.1 | 5.5 | 8.0 | 3.70 |
| 14 | 100 | 150 | 11.5 | 0.9 | 32.0 | 1.49 |
| 15 | 120 | 100 | 11.3 | 2.5 | 14.7 | 3.15 |
| 16 | 150 | 100 | 11.1 | 5.2 | 9.0 | 3.63 |
| 17 | 100 | 150 | 11.5 | 0.9 | 31.1 | 1.48 |
| 18 | 120 | 100 | 11.3 | 2.4 | 14.6 | 3.11 |
| 19 | 150 | 100 | 11.1 | 5.1 | 9.5 | 3.62 |
| 20 | 100 | 150 | 11.5 | 0.8 | 32.2 | 1.50 |
| 21 | 120 | 100 | 11.3 | 2.3 | 15.0 | 3.01 |
| 22 | 150 | 100 | 11.1 | 5.2 | 9.7 | 3.55 |
| 23 | 100 | 150 | 11.5 | 0.7 | 33.0 | 1.47 |
| 24 | 120 | 100 | 11.3 | 2.2 | 14.9 | 3.04 |
| 25 | 150 | 100 | 11.1 | 5.2 | 9.7 | 3.55 |
| 26 | 100 | 150 | 11.5 | 0.8 | 32.2 | 1.52 |
| 27 | 120 | 100 | 11.3 | 2.2 | 14.8 | 3.05 |
| 28 | 150 | 100 | 11.1 | 5.1 | 9.8 | 3.47 |
| 29 | 100 | 150 | 11.5 | 0.8 | 32.2 | 1.50 |
| 30 | 120 | 100 | 11.3 | 2.3 | 15.0 | 3.01 |
| 31 | 150 | 100 | 11.1 | 5.1 | 9.9 | 3.45 |

Each of the nickel hydroxides 1 to 13 thus obtained and lithium hydroxide were mixed in such a manner that the atomic ratio of lithium:(nickel+cobalt) was 1.03:1. The mixture was baked at 750° C. in oxygen atmosphere for 10 hours, to synthesize $LiNi_{0.85}Co_{0.15}O_2$. The positive electrode active materials obtained from the nickel cobalt hydroxides 1 to 13 were designated as positive electrode active materials 1 to 13.

By using the same procedure as that described above, but changing the lithium salt, baking atmosphere, and baking temperature as shown in the following Table 2, the following oxides were prepared: positive electrode active materials 14 to 16 of $LiNi_{0.80}Co_{0.15}Al_{0.05}O_2$; positive electrode active materials 17 to 19 of $LiNi_{0.70}Co_{0.15}Al_{0.15}O_2$; positive electrode active materials 20 to 22 of $LiNi_{0.70}Co_{0.15}Mn_{0.15}O_2$; positive electrode active materials 23 to 25 of $LiNi_{0.60}Co_{0.20}Mn_{0.20}O_2$; positive electrode active materials 26 to 28 of $LiNi_{0.55}Co_{0.225}Mn_{0.225}O_2$; and positive electrode active materials 29 to 31 of $LiNi_{0.50}Co_{0.25}Mn_{0.25}O_2$.

TABLE 2

| Positive electrode active material No. | Nickel hydroxide No. | Lithium salt | Baking atmosphere | Baking temperature (° C.) |
|---|---|---|---|---|
| 14 to 16 | 14 to 16 | Lithium hydroxide | Oxygen | 780 |
| 17 to 19 | 17 to 19 | Lithium hydroxide | Oxygen | 800 |
| 20 to 22 | 20 to 22 | Lithium hydroxide | Oxygen | 820 |
| 23 to 25 | 23 to 25 | Lithium carbonate | Air | 890 |
| 26 to 28 | 26 to 28 | Lithium carbonate | Air | 920 |
| 29 to 31 | 29 to 31 | Lithium carbonate | Air | 930 |

Next, using the positive electrode active materials for batteries thus obtained, cylindrical lithium secondary batteries were produced.

(Preparation of Positive Electrode Plate)

A positive electrode active material 3 for a battery prepared in the above manner, carbon black serving as a conductive agent, and an aqueous dispersion of polytetrafluoroethylene as a binder were mixed and dispersed in a mass ratio of solid contents of 100:3:10. This mixture was suspended in an aqueous solution of carboxymethyl cellulose, to form a positive electrode mixture paste. This positive electrode mixture paste was applied onto both sides of a 30-μm thick current collector made of aluminum foil by the doctor blade method, so that the total thickness was approximately 230 μm. As used herein, the total thickness refers to the total thickness of the current collector and the paste applied onto both sides of the current collector.

After it was dried, it was rolled to a thickness of 180 μm and cut into predetermined dimensions to obtain a positive electrode plate. An aluminum positive electrode lead was welded to the area of the current collector on which no positive electrode active material layer was formed.

(Preparation of Negative Electrode Plate)

Natural graphite serving as a negative electrode active material and a styrene-butadiene-rubber-type binder were mixed and dispersed in a mass ratio of 100:5 to form a negative electrode mixture paste. This negative electrode mixture paste was applied onto both sides of a 20-μm thick current collector made of copper foil by the doctor blade method, so that the total thickness was approximately 230 μm. The total thickness means the same as described above.

After it was dried, it was rolled to a thickness of 180 μm and cut into predetermined dimensions to obtain a negative electrode plate. A nickel negative electrode lead was welded to the area of the current collector on which no negative electrode active material layer was formed.

(Preparation of Non-Aqueous Electrolyte)

A non-aqueous electrolyte was prepared by dissolving $LiPF_6$ as a solute at a concentration of 1 mol/L in a solvent mixture of ethylene carbonate (EC) and diethyl carbonate (DEC) in a molar ratio of 1:3.

(Assembly of Battery)

The positive electrode plate and the negative electrode plate obtained in the above manner were spirally wound with a separator comprising a 25-μm thick polyethylene microporous film interposed therebetween, to form an electrode plate assembly. This electrode plate assembly was placed in a battery case, into which the non-aqueous electrolyte was injected. The battery case was then sealed to obtain a cylindrical lithium secondary battery of the invention as illustrated in FIG. 1.

The battery case was sealed by crimping the open edge of the battery case onto a seal member with an insulating gasket therebetween in such a manner that the compression rate of the insulating gasket was 30%.

The battery thus obtained had a diameter of 18.0 mm, a total height of 65.0 mm, and a battery capacity of 2000 mAh.

Examples 2 to 15

Cylindrical lithium secondary batteries of the invention were produced in the same manner as in Example 1, except for the use of the positive electrode active materials 4 to 11, 15, 18, 21, 24, 27, and 30 instead of the positive electrode active material 3.

Comparative Examples 1 to 8

Cylindrical lithium secondary batteries for comparison were produced in the same manner as in Example 1, except for the use of the positive electrode active materials 1 to 2, 14, 17, 20, 23, 26, and 29 instead of the positive electrode active material 3.

Comparative Examples 9 to 16

Cylindrical lithium secondary batteries for comparison were produced in the same manner as in Example 1, except for the use of the positive electrode active materials 12 to 13, 16, 19, 22, 25, 28, and 31 instead of the positive electrode active material 3.

After the aging period of 24 hours for battery stabilization, the cylindrical lithium secondary batteries of Examples 1 to 15 and Comparative Examples 1 to 16 were charged at a charge voltage of 4.2 V for 5 hours. They were then discharged to 3.0 V at a constant current of 400 mA (0.2 CmA). For further stabilization, they were subjected to 10 charge/discharge cycles of a 4.2 V charge and a 3.0 V discharge.

Thereafter, they were charged at a charge voltage of 4.2 V for 3 hours and discharged to 3.0 V at a constant current of 400 mA. The discharge capacity obtained was defined as 0.2 CmA capacity. Subsequently, they were charged under the above conditions and discharged to 3.0 V at a constant current of 4000 mA. The discharge capacity obtained was defined as 2 CmA capacity. The retention ratio of 2 CmA capacity to 0.2 CmA capacity was defined as high-rate discharge characteristic. Table 3 shows the evaluation results of battery performance.

TABLE 3

| Battery | Lithium hydroxide No. | Positive electrode active material No. | High-rate discharge characteristic (%) |
| --- | --- | --- | --- |
| Example 1 | 3 | 3 | 93.0 |
| Example 2 | 4 | 4 | 91.5 |
| Example 3 | 5 | 5 | 92.5 |
| Example 4 | 6 | 6 | 92.0 |
| Example 5 | 7 | 7 | 91.0 |
| Example 6 | 8 | 8 | 90.6 |
| Example 7 | 9 | 9 | 90.2 |
| Example 8 | 10 | 10 | 90.1 |
| Example 9 | 11 | 11 | 90.0 |
| Example 10 | 15 | 15 | 91.0 |
| Example 11 | 18 | 18 | 90.8 |
| Example 12 | 21 | 21 | 90.9 |
| Example 13 | 24 | 24 | 90.8 |
| Example 14 | 27 | 27 | 90.7 |
| Example 15 | 30 | 30 | 90.6 |
| Comparative Example 1 | 1 | 1 | 95.0 |
| Comparative Example 2 | 2 | 2 | 94.0 |
| Comparative Example 3 | 14 | 14 | 94.1 |
| Comparative Example 4 | 17 | 17 | 94.0 |
| Comparative Example 5 | 20 | 20 | 95.0 |
| Comparative Example 6 | 23 | 23 | 94.6 |
| Comparative Example 7 | 26 | 26 | 94.7 |
| Comparative Example 8 | 29 | 29 | 94.1 |
| Comparative Example 9 | 12 | 12 | 69.9 |
| Comparative Example 10 | 13 | 13 | 68.0 |
| Comparative Example 11 | 16 | 16 | 69.0 |
| Comparative Example 12 | 19 | 19 | 68.5 |
| Comparative Example 13 | 22 | 22 | 68.0 |
| Comparative Example 14 | 25 | 25 | 65.0 |
| Comparative Example 15 | 28 | 28 | 64.8 |
| Comparative Example 16 | 31 | 31 | 64.2 |

From a comparison of battery performance between the batteries of Examples 1 to 15 and the batteries of Comparative Examples 1 to 16, it has been found that the use of a positive electrode active material having a small particle size and a large DBP absorption amount results in an excellent high-rate storage discharge characteristic. This suggests that when a raw material nickel hydroxide has a small particle size and a large DBP absorption amount, the resultant positive electrode active material has a large contact area with electrolyte and excellent electrolyte retention, so that ions are exchanged efficiently at high power.

The batteries of Comparative Examples 1 to 8 have an excellent high-rate discharge characteristic, but the nickel hydroxides 1 to 2, 14, 17, 20, 23, 26, and 29 have a low tap density and an excessively small particle size or an excessively large DBP absorption amount. It is thus clear that the agglomerated particles of the positive electrode active materials 1 to 2, 14, 17, 20, 23, 26, and 29 have many void spaces therein, and it is clear that the electrode pressing characteristics become low. Hence, when the positive electrode active materials 1 to 2, 14, 17, 20, 23, 26, and 29 are used to produce high capacity batteries, a problem occurs in electrode production.

Conversely, in the case of using an active material having a large particle size and a small DBP absorption amount such as the positive electrode active materials 12 to 13, 16, 19, 22, 25, 28, and 31, it is suggested that the production of an electrode plate for a high capacity battery becomes easy, but the high-rate discharge characteristic is found to become low.

INDUSTRIAL APPLICABILITY

Recently, electronic devices are rapidly becoming cordless and more portable. As the power source for such devices, there is a large demand for secondary batteries that are small, lightweight, and high in energy density. In such respects, there are large expectations for non-aqueous electrolyte secondary batteries as batteries having high voltage and high energy density. Therefore, since the non-aqueous electrolyte secondary battery of the invention has both high capacity and high power characteristics, it is useful as the power source for portable appliances, etc.

The invention claimed is:

1. A nickel hydroxide having a mean primary particle size of 1 to 4.9 μm, a dibutyl phthalate (DBP) absorption amount of 10 to 30 mL/100 g, and a tap density of 2.0 to 3.5 g/cc.

2. The nickel hydroxide in accordance with claim 1, including nickel and at least one metal element selected from the group consisting of cobalt, aluminum, manganese, magnesium, iron, copper, titanium, molybdenum, and zirconium.

3. The nickel hydroxide in accordance with claim 2, wherein a molar ratio of nickel to said metal element is from 1:2 to 8:1.

* * * * *